March 12, 1968 E. A. DAMERAU 3,373,264

PUNCHED CARD READER WITH REGISTRATION INDICATING MEANS

Filed March 12, 1963 3 Sheets-Sheet 1

INVENTOR.

EDWARD A. DAMERAU

BY John V. Regan

ATTORNEY

INVENTOR.
EDWARD A. DAMERAU
BY John V. Regan
ATTORNEY

INVENTOR.
EDWARD A. DAMERAU
BY John V. Regan
ATTORNEY

United States Patent Office 3,373,264
Patented Mar. 12, 1968

3,373,264

PUNCHED CARD READER WITH REGISTRATION INDICATING MEANS

Edward A. Damerau, Pine Hill, N.J., assignor to Radio Corporation of America, a corporation of Delaware
Filed Mar. 12, 1963, Ser. No. 264,645
11 Claims. (Cl. 235—61.11)

ABSTRACT OF THE DISCLOSURE

A movable frame has opposed guide slots for receiving a record card, and the frame transports the card to a reader. Each side member of the frame has a skewed roller oriented in the same direction, and each roller projects into its associated slot to drive the card relative to the frame as the frame is moved. A pair of switch actuators project across the card path and are actuated when the card is in correct reading position.

This invention relates to document readers and, in particular, to apparatus for registering a document to be read and for detecting correct document registration.

A document reader, such as a punched card reader, often has the documents to be processed inserted manually by an operator. Information read from the document may be transmitted to a data processing system and used for inventory control, cost accounting, payroll or the like, by way of example. The document must be in proper registration with the reader mechanism in order for the information to be read correctly. Experience has shown, however, that document registration, for example, varies with the individual document insertion techniques of the operators, whereby information often is read incorrectly.

Accordingly, it is one object of the invention to provide apparatus for properly registering a document in a reader apparatus.

It is another object of this invention to provide apparatus for detecting and signalling correct document registration in a reader.

It is still another object of the invention to provide apparatus in which the functions aforementioned are performed automatically.

These and other objects are accomplished according to the invention by a movable frame having a pair of opposed guide slots, or channels, along the front surface of the frame's side members for receiving a document to be transported to a reader. The frame is constrained to move in a direction parallel to its side members between a document receiving position and a document reading position. Each of a pair of switch actuators is positioned to be engaged by a different leading edge portion of the document when the leading edge of the document is properly registered relative to the reader. A pair of spaced card stop members prevents overtravel of the document beyond reading position.

Each side member carries a pivotally mounted roller that projects into the guide channel at the front surface and projects beyond the side member at the rear surface; These rollers are skewed slightly relative to the side members. As the frame moves, the rollers cause the document to move at a slight angle relative to the direction of frame travel and at a much higher speed, forcing one side edge of the document against the far side wall of one of the guide channels.

According to another feature of the invention, the side members of the frame are constrained to move along a pair of tracks by means of adjustable pressure retainers.

According to still another feature of the invention, a latch holds the frame immovable during the read operation. Stop members are provided which prevent the frame from moving more than a slight amount past latch position as the frame moves the document into reading position.

In the accompanying drawing, like reference characters denote like components, and:

Figure 1:
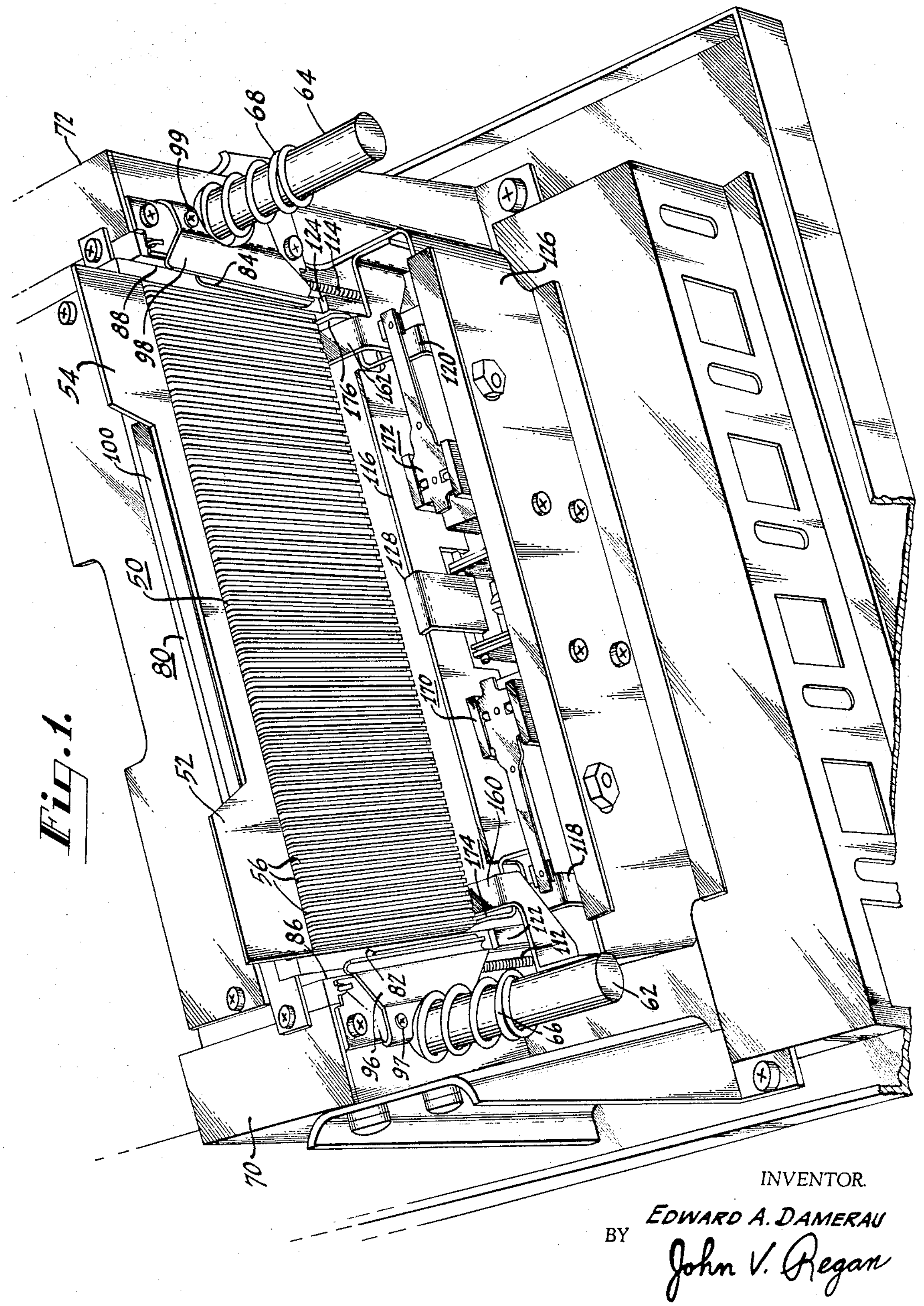
FIGURE 1 is a perspective view of a portion of a card reader, with cover removed, in which the invention is embodied.

The present invention is particularly well-suited for use in a manually operated punched card reader, and will be so described for the purpose of illustrating one example of the utility of the apparatus. It should be understood however, that reference to such an operating environment is in no way meant to constitute a limitation on the invention and that the invention may be practiced in other types of document work stations. The reader itself forms no part of the invention and will therefore not be described in any great detail. However, the reader may be similar generally to the one described in a copending application of John P. Hammel, for "Perforated Record Member Sensing Apparatus," Ser. No. 74,311, filed Dec. 7, 1960, now Patent No. 3,200,240 and assigned to the same assignee as the present invention.

The reader described in the copending application includs a pair of plates between which a punched card to be read is inserted. A first one of the plates is stationary and has thereon columns of electrically conductive strips spaced to correspond with the columns of perforations in a record card. Input leads from a stepping switch are connected to the different strips for energizing the strips one at a time. A second plate is movable on a pair of shafts toward and away from the first plate. This second plate has rows of electrically conductive strips corresponding in number and spacing to the rows of perforation positions in the record card, and each row strip has projecting contacts corresponding in number and location to the conductive column strips of the first plate. Output leads connect the row strips to a utilization device. After a card is inserted between the plates, the second plate is moved toward the first plate and against the card. The card insulates the row conductors and contacts from the column conductors, except where a perforation in the card permits a correspondingly located contact to pass through the card and make contact with a column conductor.

Faithful reproduction of the information recorded on a card requires that the card be accurately registered with respect to the reader. A record card may be considered to be in proper registration when it is so positioned that each data storage position of the card is positioned opposite the proper one of the sensing elements (for example, the contacts in the system of the copending application). Assuming that a card is fed to the reader in a direction parallel to the card columns, misregistration may result from any of the following, singly or in combination:

(a) inserting the card either too far or not far enough into the reader;

(b) inserting the card in such a way that the card columns are offset from and do not align with the respective columns of sensing transducers; or (c) inserting the card into the reader with a slight skew.

In one type of record card widely used in the industry, the distance between center lines of adjacent rows of data storage positions is ¼ inch, and the distance between center lines of adjacent columns is 3/32 of an inch. Thus, only a slight misregistration of the card may result in an erroneous reading. It is important not only to reduce the possibility of card misregistration, but also to provide means for detecting and signalling when a card is properly registered. Such signal may be used to control the operation of the reader and prevent either the reading or transmission of information when the card is misregistered.

FIGURE 1 is a perspective view of a portion of a card reader, with cover removed, in which the invention is embodied. The reader mechanism itself includes a plate 50, the top portion thereof having vertically projecting tabs 52, 54 which project higher than the remainder of the apparatus. Plate 50 has a plurality of conductive strips 56 on its front face, there being one conductive strip 56 for each column of data storage positions in a record card 60 (FIGURE 2) to be read. The strips 56, which may be conductive rubber, are located so that each one registers with a different column of the record card 60 when the card is in proper horizontal registration. Plate 50 and conductive strips 56 correspond generally to the first plate 17 and conductive strips 18, respectively, of the reader illustrated and described in the copending application.

A pair of slidable parallel shafts 62, 64 extend through opposite side mounting blocks 70, 72 of the assembly. A second reader plate 76, shown in phantom in FIGURE 3, may be mounted on shafts 62, 64 for movement therewith toward and away from the first plate 50. The second plate may be similar generally to the second plate 14 of the reader described in the copending application, and may have rows of electrically conductive rubber strips corresponding in number to the number of rows of perforation positions on the record card and located to align with the rows of a record card when the card is in proper registration. A pair of compression springs 66, 68 are fitted on the shafts 62, 64, respectively, and serve to drive the second plate away from the record card after completion of a read operation.

Figure 2:
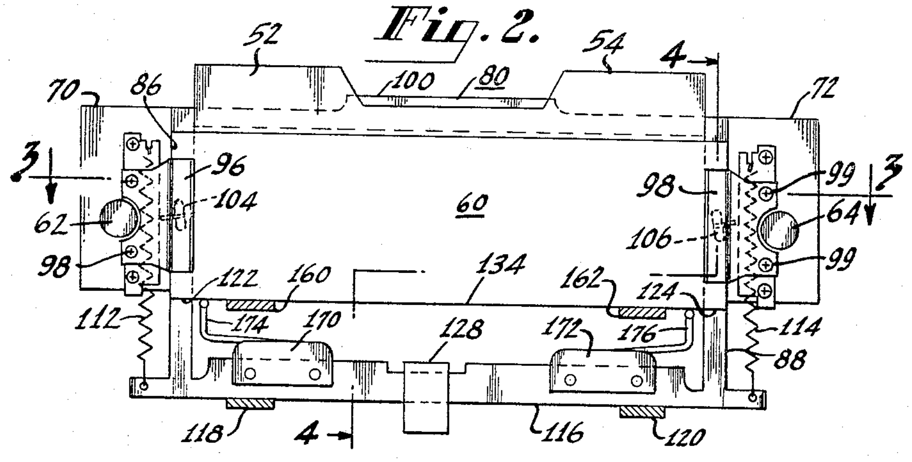
FIGURE 2 is a partial view of the reader in front elevation.

Cards 60 to be read are transported to the reader mechanism by a movable frame 80, best seen in FIGURE 2. Frame 80 has a top member 100, side members 86 and 88 and a bottom member 116. Tabs 82, 84 (FIGURE 3) project from the front surfaces of side members 86, 88, respectively, and define a pair of opposed guide slots or channels into which a card 60 may be inserted. The side mounting blocks 70, 72 of the assembly have cutout portions 92, 94 (FIGURE 3) adjacent the sides of reader plate 50 forming grooved tracks into which the side members 86, 88 are biased, whereby frame 80 is constrained to move in a vertical direction parallel to side members 86, 88. Adjustable spring tension retainers 96, 98 mounted on side mounting blocks 70, 72 bias the side members 86, 88 into the grooved tracks. The bias tension is adjustable by means of screws 97, 99. Top member 100 of frame 80 is positioned behind the vertically projecting tabs 52, 54 of reader plate 50. These tabs 52, 54 act as guides for card insertion. Also, they protect the assembly from damage due to careless handling on the part of an operator.

Frame 80 is movable in a vertical direction between first and second positions. In the first position, the top frame member 100 is approximately in line with the tops of vertically projecting tabs 52, 54. This position may be referred to as the "document receiving position" and is the rest position of the frame 80. The frame normally is biased to this position by a pair of tension springs 112, 114 (FIGURE 2), each of which is pinned at one end to an extension of the frame's bottom member 116, and is hooked over the top of the respective tension retainer 96 or 98 assembly at the other end. When a record card 60 is to be read, an operator inserts the card into the guide channels of the frame 80 and depresses the frame to the second position, illustrated in FIGURES 1, 2 and 4, by pushing downward on top frame member 100. This second position is referred to hereinafter as the "document reading position."

Figure 3:
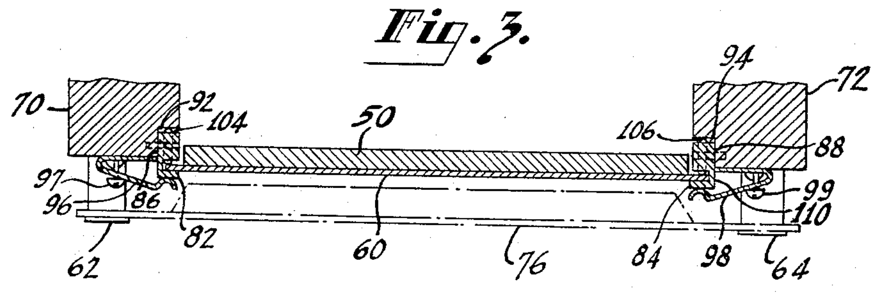
FIGURE 3 is a plan view of the reader taken along the lines 3—3 in FIGURE 2.

Each side member 86, 88 carries a pivotally mounted roller 104, 106, respectively (FIGURES 2 and 3) that projects into the guide channel at the front surface of its respective side member and projects beyond the side member at the rear surface thereof (FIGURE 3). The spacing between a roller and the front wall of its associated guide channel is chosen so that a record card 60 will fit therebetween without slipping and will not move in a downward direction except when driven by the rollers 104, 106 as the frame 80 is moved. Rollers 104, 106 ride along the back walls of the grooved tracks 92, 94 as the frame is moved, and drive the card 60 at twice the speed of the frame 80. This assures that the card 60 is positively driven into the reader. The adjustable pressure retainers 96, 98 are adjusted to provide the correct pressure on the rollers 104, 106. Side frame members 86, 88 have shoulders 122, 124 (FIGURE 1) which project into the path of card 60 travel and set the lowermost position of the card 60 relative to the frame 80. The rollers 104, 106 drive the card 60 against these shoulders, which serve as card stops, when the frame 80 is depressed.

A pair of frame stop members 118, 120 (FIGURE 1) are mounted on a front assembly plate 126 and extend across the path of frame 80 travel. These stop members 118, 120 determine the lowermost position of the frame 80. A solenoid operated latch member 128 is spring biased against bottom frame member 116 and just clears the top edge of bottom frame member 116 when the bottom member 116 contacts the frame stop members 118, 120. Bias springs 112, 114 bias the frame into contact with the underside of latch member 128 when the operator releases the frame 80. This position of the frame is the "document read position"; and latch member 128 holds the frame 80 in this position during the read operation.

Figure 4:
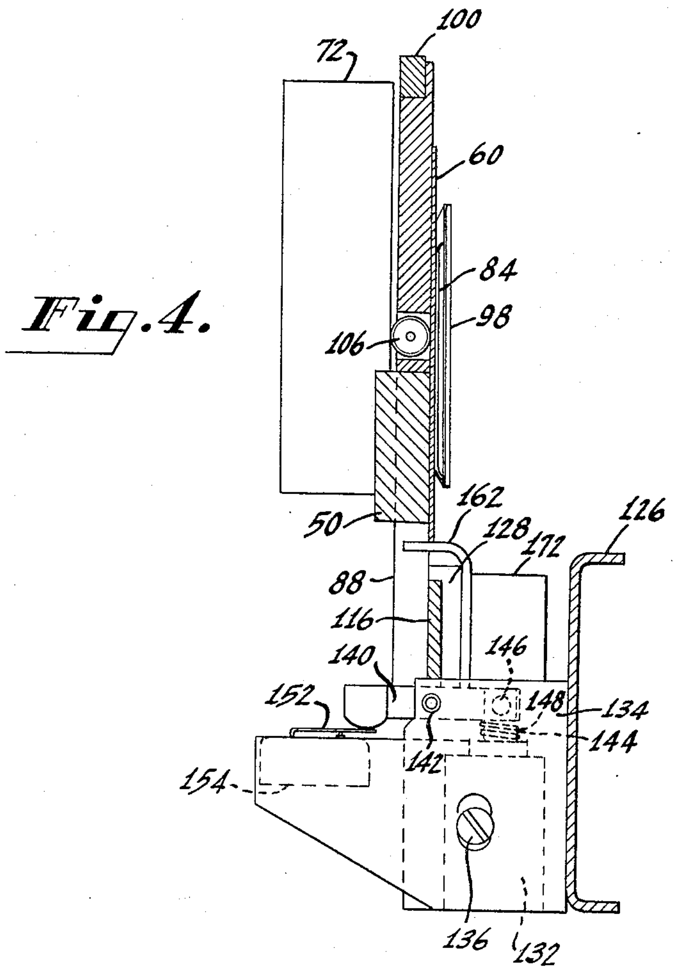
FIGURE 4 is a side elevation view of section taken along the lines 4—4 of FIGURE 2.

The latch member 128 and its controlling solenoid 132 are best illustrated in FIGURE 4. The solenoid 132 is mounted between a pair of brackets 134, carried by front assembly plate 126, and is secured to the brackets by means of screws 136. The brackets 134 have elongated slots for receiving the screws 136, whereby the vertical position of the solenoid 132 may be adjusted. The vertical latch member 128 has a lip at its top which fits over and engages the top surface of bottom frame member 116. Latch member 128 extends upward from a horizontal arm 140 which is pivotally mounted on a pin 142 through brackets 134. Arm 140 is pinned to the solenoid plunger 144 at one end by a pin 146. A compression spring 148 fitted over plunger 144 biases the arm 140 and latch member 128 in the counter-clockwise direction when the solenoid 132 is deenergized.

The left end of arm 140 engages an actuator arm 152 of a switch 154, and depresses the actuator to close the switch 154 when the frame 80 is held by the latch member 128. Switch 154 may control circuitry for moving second reader plate 76 (FIGURE 3) against card 60, and may also control the reader mechanism. At the completion of a read operation, solenoid 132 (FIGURE 4) is energized momentarily, by means not shown. Plunger 144 then is pulled into solenoid 132, causing arm 140 to rotate clockwise on pin 142 and move latch member 128 away from bottom frame member 116. Tension springs 112, 114 (FIGURE 2) then return the frame 80 to the document receiving position. Card 60 is driven upward by rollers 104, 106 at twice the speed of the frame 80. When frame 80 is in the document receiving position and solenoid 132 becomes deenergized, the lip on latch mechanism 128 is biased against the front surface of bottom frame member 116 by action of the compression spring 148 on plunger 144.

Card stops 122, 124 (FIGURE 1) are so located on the frame's side members 86, 88 that a card 60 is in proper vertical registration with the reader when (a) frame 80 is held in the document read position by latch member 128, and (b) the leading edge corners of card 60 abut against both card stop members 122, 124. It was mentioned previously that the frame stop members 118, 120 allow the bottom frame member 116 to just clear the lip of latch member 128 when the operator depresses the frame 80. This prevents a large upward movement of the frame 80 when the operator releases the frame 80, and thus prevents the card 60 from being driven upward away from card stops 122, 124 by rollers 104, 106.

In some cases, a lower corner of the card being transported may be bent or mutilated. If this happens, it is possible that that corner of the card may not be stopped by the associated card stop 122 or 124, and the card may become skewed relative to the reader. This is prevented by a pair of auxiliary card stops 160, 162. These stops 160, 162 are mounted on front assembly plate 126 and extend across the path of card travel near opposite side members 86, 88 of the frame 80. These auxiliary card stops 160, 162 are located to engage different leading edge portions of the card and stop the card in proper vertical registration. When the bottom member 116 of frame 80 is held by latch member 128, the card stops 122, 124 and auxiliary card stops 160, 162 are in horizontal alignment.

Some tolerance in the dimensions of the frame 80 assembly may occur in the manufacture thereof, whereby the distance between the far side walls of the card guide channels may be slightly greater than the width of a normal record card 60. Also, some tolerance may occur in the dimensions of the record cards. These and like tolerances may result in a record card being fed to the reader such that the card columns are displaced laterally relative to the reader column strips 56. Stated another way, the card may be horizontally misregistered, and the misregistration may be sufficient to cause an erroneous reading of the punched information.

Horizontal misregistration is effectively eliminated according to another feature of the invention in the following manner. In the assembly of the apparatus, the reader plates are horizontally referenced relative to the far side wall 110 (FIGURE 3) of the right hand card guide channel. Accordingly, a card 60 is in horizontal registration when its right edge, as viewed in FIGURES 2 and 3, rests against the far wall 110 of the right guide channel. As will be noted in FIGURE 2, the rollers 104, 106 are skewed at a slight angle to the vertical. Accordingly, as the frame 80 is depressed, these rollers 104, 106 drive the card 60 to the right against the wall 110 aforementioned, whereby proper horizontal registration with the reader is assured.

It is desirable that some means be provided for detecting and signalling when a card is in registration with the reader. Sometimes a card is badly mutilated, or is inserted incorrectly in the frame 80 by the operator, or is badly skewed, or for other reasons such as impact type actuation causing card bounce, the card cannot be properly registered by the apparatus described above. Detection and signalling correct registration is accomplished according to the invention by a pair of sensitsive switches 170, 172 (FIGURE 1) having actuator arms 174, 176, respectively. These switches are of the type which are actuated by a small downward movement of the arms, and the arms may be depressed by only slight downward pressure thereon.

The free ends of the actuator arms 174, 176 are positioned across the path of card travel near opposite ends of the reader plate 50 (FIGURE 1), whereby the arms 174, 176 may be engaged by widely separated leading edge portions of a card 60. The arms 174, 176 are so located vertically as to be slightly higher than the auxiliary card stops 160, 162 when no card is in the reader, and to both be depressed sufficiently to actuate their respective switches only when a card 60 rests on both of the auxiliary card stops 160, 162. Accordingly, it may be seen that neither switch 170, 172 is actuated in the event the card 60 is not fed fully into the reader, and only one switch may be actuated if the card is skewed. Both switches 170, 172 are actuated only when the card is in proper vertical registration. The outputs of both switches may be used to generate a control signal for enabling the reader.

Figure 5:
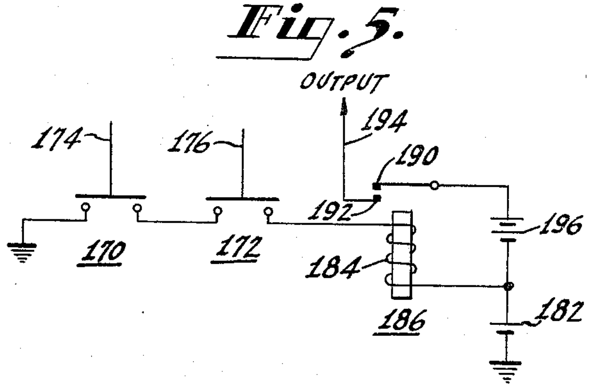
FIGURE 5 is a schematic view illustrating the manner in which the switches of FIGURE 1 may be used for control purposes.

FIGURE 5 is a schematic diagram illustrating the manner in which the switches 170, 172 may be used for control purposes. Switches 170, 172, when closed by depressing the respective actuator arms 174, 176, connect the coil 184 of a relay 186 in series with a battery 182 to energize the relay. Movable relay contact 190 then is pulled into contact with a stationary contact 192 to connect an output line 194 to ground through the pair of batteries 182, 196. By way of example, the voltage on the output line 194 may control a D.C. motor for moving the second reader plate 76 (FIGURE 3) into read position, or it may energize a logic circuit to control the reading and transmission of information.

What is claimed is:

1. The combination of:

a document work station;

a movable frame having a pair of opposed guide channels along the sides thereof for receiving a document in a certain plane to be then transported by said frame to said station in the same said plane;

a pair of switches; and a pair of switch actuators, one for each switch, each positioned across the path of document travel and located so that each actuator is engaged by a different leading edge portion of the document when the document is correctly registered in said station.

2. The combination comprising:

a document work station;

a movable frame having a pair of opposed guide channels along the sides thereof for receiving a document in a certain plane to be then transported by said frame to said station in the same said plane;

means constraining the frame for movement along one path toward and away from said station;

a pair of document stop members positioned across the path of document travel to interrupt the document when the document's leading edge is correctly registered with respect to said station, each stop member being positioned to engage a different leading edge portion of the document;

a pair of switches; and a pair of switch arms, one for each switch, each arm being positioned across the path of document travel and so located as to be actuated by a different leading edge portion of the document when the leading edge is correctly registered in said station.

3. The combination comprising:

a document reader;

a movable frame having a pair of opposed guide slots along the sides thereof for receiving a document in a certain plane to be then transported by said frame to to said reader in the same said plane;

a pair of stop members positioned across the path of frame travel for interrupting frame travel with the document in said reader;

a pair of document stop members projecting from the sides of said frame and positioned so as to register the leading edge of the document relative to the reader when the frame travel is interrupted by the frame stop members;

a pair of switches; and a pair of switch arms, one of each switch, the arms being positioned across the path of document travel and so located as to be actuated by a different leading edge portion of the document when the leading edge of the document is correctly registered relative to said reader.

4. The combination comprising:
a document reader;
a movable frame having a pair of opposed guide channels along the side members thereof for receiving a document to be transported to said reader;
means constraining the frame for movement along a fixed path between a document receiving position and a document reading position, said reader being referenced relative to one side member of said frame;
a pair of rollers, each carried by a different side member of said frame and being skewed at substantially the same acute angle relative to the direction of frame travel, each roller projecting into the guide channel at the front surface of the associated side member for driving the document toward said one side member as said frame is moved to said document reading position;
means positioned across the path of document travel for interrupting the document when the document is in position to be read by said reader;
a pair of switches; and
a pair of switch actuators positioned across the path of of document travel and located so as to be engaged by different leading edge portions of the document when the leading edge is correctly registered relative to the reader.

5. The combination comprising:
a document reader;
a movable frame having a pair of opposed guide members along the side members thereof for receiving a document to be transported to said reader;
means constraining the frame for movement in a direction parallel to the side members of the frame;
a pair of pivotally mounted rollers, each carried by a different side member of said frame and being skewed at substantially the same slight angle relative to the direction of frame travel, each roller projecting into the guide channel of the associated side member, against the document, and projecting beyond the side member at the opposite surface thereof;
means adjacent each said opposite surface of a side member against which said rollers are biased;
means positioned across the path of document travel for interrupting document travel when the document is adjacent said reader;
a pair of switches; and
a pair of switch arms, one for each switch, said arms being positioned across path of document travel and so located that each arm is actuated by a different leading edge portion of the document when the leading edge is correctly registered with respect to the reader.

6. The combination comprising:
a document reader;
a movable frame having a pair of opposed guide members along the side members of the frame for receiving a document to be transported to said reader;
means constraining the frame for movement in a direction parallel to the side members of the frame;
a pair of pivotally mounted rollers each carried by a different side member of said frame, each roller projecting into the guide channel of the associated side member against the document for driving the document relative to the frame when the frame is moved;
means positioned across the path of document travel for interrupting document travel when the document is adjacent said reader;
a pair of switches;
a pair of switch arms, one for each switch, said arms being positioned across the path of document travel so that each arm is actuated by a different leading edge portion of the document when the leading edge is correctly registered with respect to the reader; and
means for holding the frame in a fixed position when the document is in reading position.

7. The combination comprising:
a document reader;
a movable frame having a pair of opposed guide channels along the side members thereof for receiving a document in a certain plane to be then transported by said frame in the same said plane;
a pair of grooved tracks for receiving the side members of said frame;
adjustable means biasing said side members into said tracks for constraining the movement of said frame in a direction along said tracks;
a pair of spaced stop members positioned across the path of document travel to interrupt the document when the document is in position to be read by said reader;
a pair of switches; and
a pair of switch arms for said switches, said arms being positioned across the path of document travel and located so that both arms are actuated, each by a different leading portion of the document, when the leading edge of the document is correctly registered relative to said reader.

8. The combination comprising:
a document reader;
a movable frame having a pair of opposed guide slots along the side members thereof for receiving a document to be transported to said reader;
a pair of grooved tracks for receiving said side members, whereby said frame is constrained to travel along a fixed path toward and away from said reader;
a pair of pivotally mounted rollers, each carried by a different side member and being skewed at substantially the same acute angle relative to the path of frame travel, each roller projecting into the guide channel of the associated side members, against the document, and projecting beyond the side member at the opposite surface thereof;
adjustable means biasing the side members into associated said tracks with each roller biased against a wall of the associated tracks;
a pair of switches; and
a pair of spaced switch arms, one for each switch, positioned across the path of document travel and so located that each arm is actuated by a different leading edge portion of the document when the document is correctly registered in said reader.

9. The combination comprising:
a document work station;
a movable frame having a pair of opposed guide channels along the side members thereof for receiving a document to be transported to said station; and
a pair of rollers each carried by a different side member of said frame and being skewed at substantially the same acute angle relative to the direction of frame travel, each roller projecting into the guide channel of the associated side member for driving the document toward one side member as said frame is moved to said station and so arranged and mounted on said frame as to drive said document at a faster rate than that at which said frame travels.

10. The combination comprising:
a document work station;
a movable frame having a pair of opposed guide channels along the side members thereof for receiving a document to be transported to said station;
means constraining the frame for movement along a fixed path toward and away from said station, said station being referenced in one direction relative to one side member of said frame; and
a pair of rollers carried by said frame and each projecting into a different guide channel for driving the document relative to the frame, each roller being skewed at substantially the same acute angle relative to the direction of frame travel for moving the document toward said one side member as said frame is moved toward said work station and so arranged and mounted on said frame as to drive said document at a faster rate than that at which said frame travels.

11. The combination comprising:

a document reader;

a movable frame having a pair of opposed guide means along the side members thereof for receiving a document to be transported to said reader;

means constraining the frame for movement along a given path toward and away from said reader, said reader being physically referenced relative to one side member of said frame;

a pair of pivotally mounted rollers carried by said side members and each projecting into the guide means of the associated side member, against the document, and projecting beyond the side member at the opposite surface thereof, said rollers being skewed at substantially the same acute angle relative to the direction of frame travel for driving the document toward said one side member as said frame is moved toward said station and so arranged and mounted on said frame as to drive said document at a faster rate than that at which said frame travels; and means at the said opposite surface of each side member against which said rollers are biased.

References Cited

UNITED STATES PATENTS

| | | | |
|---|---|---|---|
| 1,991,729 | 2/1935 | Brougham | 101—1 |
| 2,792,045 | 5/1957 | Ingels | 153—28 |
| 3,139,519 | 6/1964 | Reinschmidt | 235—61.11 |
| 3,276,260 | 8/1966 | Baker | 235—61.11 |

MAYNARD R. WILBUR, *Primary Examiner.*

DARYL W. COOK, *Examiner.*

R. COUNCIL, *Assistant Examiner.*